(12) United States Patent
Rees et al.

(10) Patent No.: US 7,653,082 B2
(45) Date of Patent: Jan. 26, 2010

(54) COMMUNICATION SYSTEMS

(75) Inventors: George Rees, Dronfield (GB); Robert Hodge, Leamington Spa (GB)

(73) Assignee: Ericsson AB, Stockholm (SE)

( * ) Notice: Subject to any disclaimer, the term of this patent is extended or adjusted under 35 U.S.C. 154(b) by 587 days.

(21) Appl. No.: 10/562,761

(22) PCT Filed: Jun. 28, 2004

(86) PCT No.: PCT/EP2004/051279

§ 371 (c)(1),
(2), (4) Date: Jun. 7, 2006

(87) PCT Pub. No.: WO2005/004394

PCT Pub. Date: Jan. 13, 2005

(65) Prior Publication Data

US 2007/0115836 A1  May 24, 2007

(30) Foreign Application Priority Data

Jul. 1, 2003  (GB) ................................. 0315366.5

(51) Int. Cl.
H04J 3/16  (2006.01)
(52) U.S. Cl. ...................................... 370/466; 370/242
(58) Field of Classification Search ................ 370/465, 370/466, 469, 242, 244, 245, 236, 236.1, 370/236.2, 468; 709/223, 224, 246
See application file for complete search history.

(56) References Cited

U.S. PATENT DOCUMENTS 4,753,529 A  6/1988  Layton

| 7,315,511 | B2* | 1/2008 | Morita et al. | 370/227 |
| 7,417,950 | B2* | 8/2008 | Hofmeister et al. | 370/230 |
| 2002/0076857 | A1* | 6/2002 | Hinkle et al. | 438/123 |
| 2002/0196508 | A1 | 12/2002 | Wei et al. | |
| 2003/0023709 | A1* | 1/2003 | Alvarez et al. | 709/223 |
| 2003/0161269 | A1* | 8/2003 | Brusamolino et al. | 370/235.1 |
| 2003/0165153 | A1* | 9/2003 | Maggio et al. | 370/437 |
| 2004/0076166 | A1* | 4/2004 | Patenaude | 370/401 |
| 2004/0174902 | A1* | 9/2004 | Russell et al. | 370/466 |
| 2004/0177161 | A1* | 9/2004 | Hoang | 709/246 |
| 2004/0246989 | A1* | 12/2004 | Brolin | 370/466 |
| 2006/0274782 | A1* | 12/2006 | Rikitake | 370/465 |
| 2008/0037581 | A1* | 2/2008 | Asano | 370/466 |

FOREIGN PATENT DOCUMENTS

EP  0 718 990 A2  6/1996
WO  WO 01/25847 A1  4/2001

* cited by examiner

*Primary Examiner*—Chi H. Pham
*Assistant Examiner*—Kevin Mew
(74) *Attorney, Agent, or Firm*—Kirschstein, et al.

(57) ABSTRACT

An SDH network has a network management system to monitor the functionality of SDH network elements in the SDH network. The SDH network is arranged to transport Ethernet information in SDH format across the SDH network, and is at least partially situated at a host site. An Ethernet network is situated at a user site. An SDH network element converts the SDH format Ethernet information into Ethernet format information for transportation between the host and user sites via a link. An Ethernet network element receives the Ethernet format information. The SDH network element can request the status of the Ethernet network element when the SDH network element is required to update the SDH network management system with status information on the functionality of the SDH network element and the Ethernet network element.

17 Claims, 2 Drawing Sheets

COMMUNICATION SYSTEMS

The present invention relates to communication system, in particular a communication comprising a first network at the host site and a second network at a user site and means for the first network to monitor the functionality of network elements in the second network without placement of first network elements with the second network. More particularly, the first network may be a synchronous digital hierarchy (hereinafter SDH) network and the second network may be an Ethernet network. There is also provided a method for the same.

FIG. 1 illustrates a prior art managed communication system 10, wherein there is provided a SDH network comprising interconnected SDH network elements 12 and 14 situated at a host site 16 and an SDH network element 18 situated at a user site 20. The functionality of the SDH network elements 12, 14 and 18 is monitored by a SDH network management system 22, connected to the SDH network elements 12, 14 and 18, and which is arranged to either constantly or periodical assess the operation of all the SDH network elements 12, 14 and 18 and to report faults associated with the SDH network elements 12,14 and 18.

The user site 20 has a Ethernet network situated thereat and a network termination element 24, connected to SDH network element 18, which is arranged to convert SDH format information at terminal 26 into Ethernet format information provided at terminal 28 which is fed into the Ethernet network. SDH format information is transported between SDH network elements 12, 14 and 18, via an SDH link 30 between the host 16 and user 20 sites to arrive at the network termination element 24. It will be understood that the network termination element 24 is also arranged to convert Ethernet format information received from the Ethernet network at terminal 28 into SDH format information, provided at terminal 26, for transportation over the SDH network elements 12, 14 and 18 and the SDH link 30.

Furthermore, it will be understood that the SDH network management system 22 can determine the functionality of the SDH network element 18 located at a user site 20 and whether or not the SDH format information has successfully been transported between the host 16 and user 20 sites via SDH link 30.

At the user site 20, the SDH network element 18 and the network termination element 24 can also be interconnected via channel 32 so that the SDH network element 18 can determine whether or not the network termination element 24 is functioning correctly, and importantly, whether or not Ethernet format information is present at the terminal 28 of the network termination element 24.

In this manner, the SDH network management system 22 can determine via interrogation of the SDH network element 18, which is turn interrogates the network termination element 24, whether or not Ethernet format information is present at terminal 28. Therefore, this communication system 10 is said to be managed as the SDH network management system 22 can determine from the host site 16 whether or not Ethernet format information is present at terminal 28.

However, it will be noted that this type of communication system 10 requires that a SDH network element 18 be present at the user site 20 and that a SDH link 30 be connected between the host 16 and the user 20 sites to transport what is essentially Ethernet information in SDH format. This is an expensive means of ensuring that the SDH network management system 22 has visibility of the functionality of terminal 28 at the user site 20.

An alternative to the managed communication system illustrated in FIG. 1 is the implementation of a cheaper non-managed prior art communication system 40, as illustrated in FIG. 2. Communication system 40 comprises a SDH network having interconnected SDH network elements 42 and 44 situated at a host site 46. The functionality of the SDH network elements 42 and 44 is monitored by a SDH network management system 48, connected to the SDH network elements 42 and 44, and which is arranged to either constantly or periodical assess the operation of all the SDH network elements 42 and 44 and to report faults associated with the SDH network elements 42 and 44.

A user site 50 has an Ethernet network situated thereat and an opto-electrical converter 52 which is arranged to convert optical Ethernet format information at terminal 54 into electrical Ethernet format information provided at terminal 56 which is fed into the Ethernet network. Ethernet format information is transported between SDH network element 44 and the opto-electrical converter 52 via a network termination element 58, located at the host site 46, and connected to SDH network element 44. The network termination element is arranged to convert SDH format information at terminal 60 into optical Ethernet format information provided at terminal 62. The Ethernet format information is then transported between the host 46 and user 50 sites via Ethernet link 64 to arrive at terminal 54 of the opto-electrical converter 52.

It will be understood that the opto-electrical converter 52 is also arranged to convert electrical Ethernet format information received from the Ethernet network into optical Ethernet format information that can be transported via Ethernet link 64 to network termination element 58. Furthermore, the network termination element 58 is also arranged to convert optical Ethernet format information received from the Ethernet network, via the Ethernet link 64, into SDH format information for transportation over the SDH network elements 42 and 44.

At the host site 46, the SDH network element 44 and the network termination element 58 may also be interconnected via channel 66 so that the SDH network element 44 can determine whether or not the network termination element 58 is functioning correctly and whether or not Ethernet format information is present at the terminal 62 of the network termination element 58.

In this manner, the SDH network management system 48 can determine via interrogation of the SDH network element 44, which is turn interrogates the network termination element 58, whether or not Ethernet format information is present at terminal 62.

However, it will be noted that in this communication system 40, the SDH network management system 48 can only determine the functionality of the SDH network elements 42 and 44 and network termination element 58 located at a host site 46 and has not means to determine whether not the Ethernet format information has successfully been transported between the host 46 and user 50 sites via Ethernet link 64, or that the opto-electrical converter 52 is functioning correctly or that electrical Ethernet format information is present at terminal 56.

Therefore, this communication system 40 is said to be unmanaged, as the SDH network management system 48 cannot determine from the host site 46 whether or not Ethernet format information is present at the terminal 56 at the user site 50.

It is an object of the present invention to obviate or mitigate the disadvantages associated with the prior art.

According to a first aspect of the present invention, a communication system, comprises an SDH network and an Ethernet network, the SDH network having an SDH network management system to monitor the functionality of network elements in the SDH network, the SDH network being arranged to transport at least Ethernet information in SDH format across the SDH network, the SDH network being at least partially situated at a host site and the Ethernet network being situated at a user site, the SDH network comprising a SDH network element arranged to convert the SDH format Ethernet information into Ethernet format information for transportation between the host and user sites via a link between the host and user sites, and the Ethernet network comprising a Ethernet network element to receive the Ethernet format information, wherein the SDH network element can request the status of the Ethernet network element when the SDH network element is required to update the SDH network management system with status information on the functionality of the SDH network element and Ethernet network element.

In this manner, only the SDH network management system is extended to monitor the functionality of the Ethernet network elements located at the remote user site without having to extend the SDH network in its entirety to the remote site. That is, there are no SDH network elements present at the user site, but the SDH network management system can determine whether or not the Ethernet network element is functioning correctly and that there is Ethernet format information presented to the Ethernet network element. Accordingly, there is a cost saving over the prior art in that SDH network elements, which are more expensive than an Ethernet network element, do not have to be situated at the user site to implement a managed SDH and Ethernet network.

Preferably, the SDH network element may comprise network termination equipment. The network termination equipment may comprise an SDH multiplexer and an associated Ethernet conversion card.

The SDH network element may be arranged to request the status of the Ethernet network element by transmitting the request for status within the format of an Ethernet frame transported over the link. Alternatively, the SDH network element may be arranged to request the status of the Ethernet network element by transmitting the request for status between successive Ethernet frames transported over the link.

The Ethernet network element may be arranged to provide a response to the request for status from SDH network element by transmitting the response within the format of an Ethernet frame transported over the link. Alternatively, the Ethernet network element may be arranged to provide a response to the request for status from SDH network element by transmitting the response between successive Ethernet frames transported over the link.

The Ethernet network element may also be arranged to provide status information to the SDH network element by transmitting the status information within the format of an Ethernet frame transported over the link. Alternatively, the Ethernet network element may be arranged to provide status information to the SDH network element by transmitting the status information between successive Ethernet frames transported over the link. Thereby, the Ethernet network element can generate an unprompted alarm that is transmitted to the SDH network element.

The SDH network element may also be arranged to issue an instruction to the Ethernet network element by transmitting the instruction within the format of an Ethernet frame transported over the link. Alternatively, the SDH network element may be arranged to issue an instruction to the Ethernet network element by transmitting the instruction between successive Ethernet frames transported over the link. Thereby, the SDH network element can change the status of the Ethernet network element by issuing instructions that are transmitted to the Ethernet network element.

Preferably, link may be a point-to-point optical link. Furthermore, the Ethernet network element may comprise an opto-electrical converter.

The SDH network element may be further arranged to convert Ethernet format information received from the Ethernet network into SDH format information for transportation across the SDH network.

According to another aspect of the invention there is provided a method of communicating for a SDH network and an Ethernet network, the method comprising monitoring the functionality of network elements in the SDH network using an SDH network management system, arranging the SDH network to transport at least Ethernet information in SDH format across the SDH network, situating the SDH network at least partially at a host site and situating the Ethernet network at a user site, arranging a SDH network element of the SDH network to convert the SDH format Ethernet information into Ethernet format information and transporting the Ethernet format information between the host and user sites via a link between the host and user sites, and receiving the Ethernet format information with a Ethernet network element at the Ethernet network, whereby the SDH network element can request the status of the Ethernet network element when the SDH network element is required to update the SDH network management system with status information on the functionality of the SDH network element and/or Ethernet network element.

According to a third aspect of the invention a communication system, comprises an first network and a second network, the first network having an network management system to monitor the functionality of network elements in the first network, the first network being arranged to transport at least some information intended for the second network across the first network in a format compatible with the first network, the first network being at least partially situated at a host site and the second network being situated at a user site, the first network comprising a network element arranged to convert the format of the information intended for the second network into second network format information compatible with the second network for transportation between the host and user sites via a link between the host and user sites, and the second network comprising a network element to receive the second network format information wherein the network element of the first network can request the status of the network element of the second network when the network element of the first network is required to update the network management system of first network with status information on the functionality of the network element of the first network and/or the network element of the second network.

According to a fourth aspect of the invention there is provided a method of communicating for a first network and a second network, the method comprising monitoring the functionality of network elements in the first network using a network management system, arranging the first network to transport at least some information intended for the second network across the first network in a format compatible with the first network, situating the first network at least partially at a host site and situating the second network at a user site, arranging a network element of the first network to convert the format of the information intended for the second network into second network format information compatible with the second network and transporting the second network format information between the host and user sites via a link between the host and user sites, and receiving the second network format information at the second network with a network element of the second network, whereby the network element of the first network can request the status of the network element of the second network when the network element of the first network is required to update the network management system of first network with status information on the functionality of the network element of the first network and/or the network element of the second network.

The invention will now be described, by way of example only, with reference to the accompanying drawings, in which.

Figure 3:
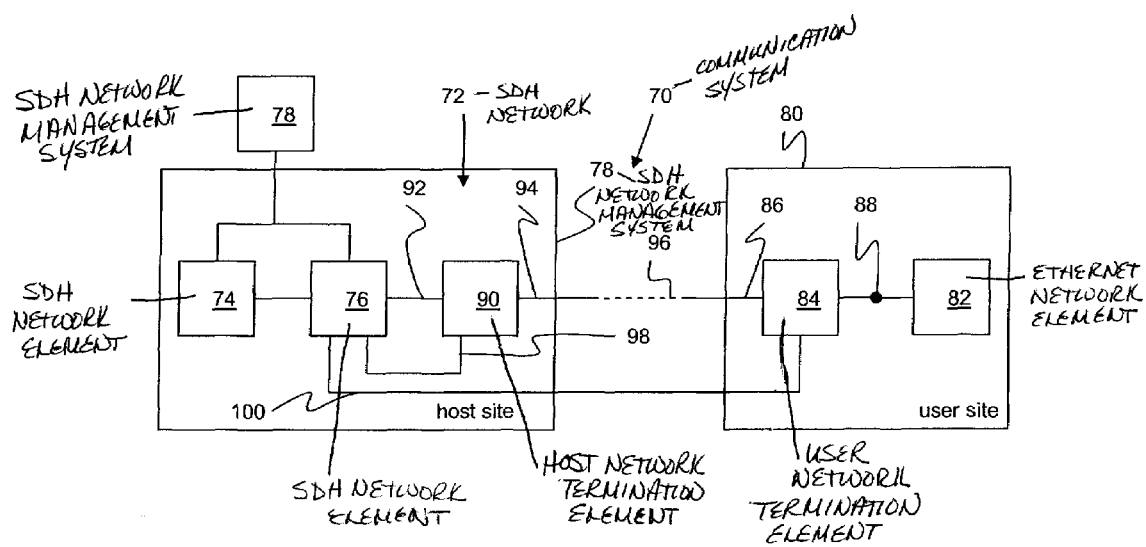
FIG. 3 illustrates an embodiment of the communication system according to the present invention.

Referring to FIG. 3, there is shown a communication system 70 according to the present invention, wherein there is provided a SDH network 72 (note only partially illustrated) comprising interconnected SDH network elements 74 and 76 situated at a host site 78, for example a local exchange. The functionality of the SDH network elements 74 and 76 is monitored by a SDH network management system 78, connected to the SDH network elements 74 and 76, and which is arranged to either constantly or periodical assess the operation of all the SDH network elements including network elements 74 and 76 and to report faults associated with the SDH network elements including network elements 74 and 76.

A user site 80 has an Ethernet network 82 situated thereat and a user network termination element 84 which is arranged to convert optical Ethernet format information at terminal 86 into electrical Ethernet format information provided at terminal 88 which is then fed into the Ethernet network 82.

Ethernet format information is transported between SDH network element 76 and the user network termination element 84 via a host network termination element 90, located at the host site 78, and connected to SDH network element 76. The host network termination element 90 is arranged to convert SDH format information at terminal 92 into optical Ethernet format information provided at terminal 94. The Ethernet format information is then transported between the host 78 and user 80 sites via Ethernet link 96 to arrive at terminal 86 of the user network termination element 84.

It will be understood that the communication system 70 is bidirectional, that is that the user network termination element 84 is also arranged to convert electrical Ethernet format information received from the Ethernet network 82 into optical Ethernet format information that can be transported via Ethernet link 96 to the host network termination element 90 and that the host network termination element 90 is also arranged to convert the optical Ethernet format information received from the Ethernet network 82, via the Ethernet link 96, into SDH format information for transportation over the SDH network 72.

At the host site 78, the SDH network element 76 and the host network termination element 90 are interconnected via channel 98 so that the SDH network element 76 can determine whether or not the host network termination element 90 is functioning correctly and whether or not optical Ethernet format information is present at terminal 94 of the host network termination element 90. Furthermore, the SDH network element 76 and the user network termination element 84 are interconnected via channel 100 so that the SDH network element 76 can determine whether or not the user network termination element 84 is functioning correctly and whether or not electrical Ethernet format information is present at terminal 94 of the host network termination element 90. It will be noted that channels 98 and 100 could be the same channel with appropriate coding or two separate channels.

Host termination element 90 could be a SDH multiplexer and associated Ethernet interface card arranged to communicate with SDH network element 76 over channel 98. The user network termination element 84 could be an Ethernet mediaconverter arranged to also communicate with the SDH network element 76 over channel 100.

It will be noted the SDH network element 76 could be arranged to request the status of the user termination element 84 by transmitting a request for status as part of the format of an Ethernet frame transported over the Ethernet link 96 and the user termination element 84 could be arranged to provide a response to the request for status from SDH network element 76 by transmitting the response as part of the format of an Ethernet frame transported over the Ethernet link 96.

Alternatively, the SDH network element 76 could be arranged to request the status of the user termination element 84 by transmitting a request for status between successive Ethernet frames transported over the Ethernet link and the user termination element 84 could be arranged to provide a response to the request for status from SDH network element 76 by transmitting the response between successive Ethernet frames transported over the Ethernet link.

It will of course be understood that a combination of the above described transportation techniques for the request for status from the user termination element 84 and response with status information from the user termination element 84 could be deployed in the communication system 70.

In this manner, the SDH network management system 78 can determine via interrogation of the SDH network element 76, which in turn interrogates the host network termination element 90, whether or not optical Ethernet format information is present at terminal 94 and the network management system 78 can determine via interrogation of the SDH network element 76, which in turn interrogates the user network termination element 84 whether or not electrical Ethernet format information is present at terminal 88.

It will be noted that the SDH network management system 78 can also determine via interrogation of the SDH network element 76, which in turn interrogates the host network termination element 90 and/or the user network termination element 84, a number of different status indicators, including, but not limited to carrier sense error, deferred transmissions, excessive collisions, frame check sequence errors, excessive frame lengths, internal media access channel receive errors, late collision frame, multiple collision frames, correct total broadcast frames received, correct total frames received, correct total frames transmitted, correct total multicast frames received and correct unicast frames received.

Figure 2:
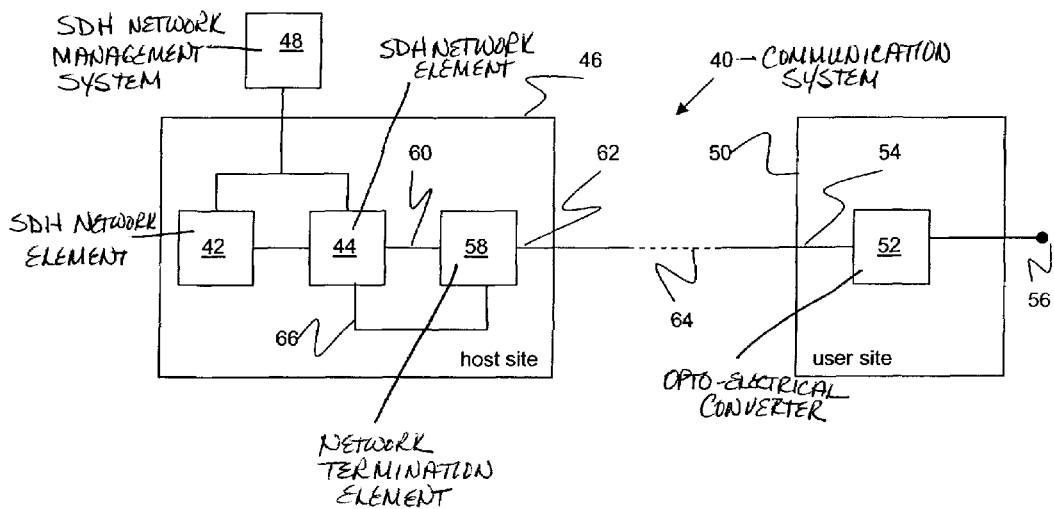
FIG. 2 illustrates a second prior art communication system comprising an SDH network and a non-managed Ethernet network.

Therefore, this communication system 70 comprises a Ethernet network 82, the input to which is managed via the SDH network management system 78 as the latter can determine from the host site 78 whether or not Ethernet format information is present at terminal 84 at the user site 80. Accordingly, since the communication system 40 as described above with reference to FIG. 2, does not provide such a facility the present invention is considered to be an improvement over that communication system 40.

Figure 1:
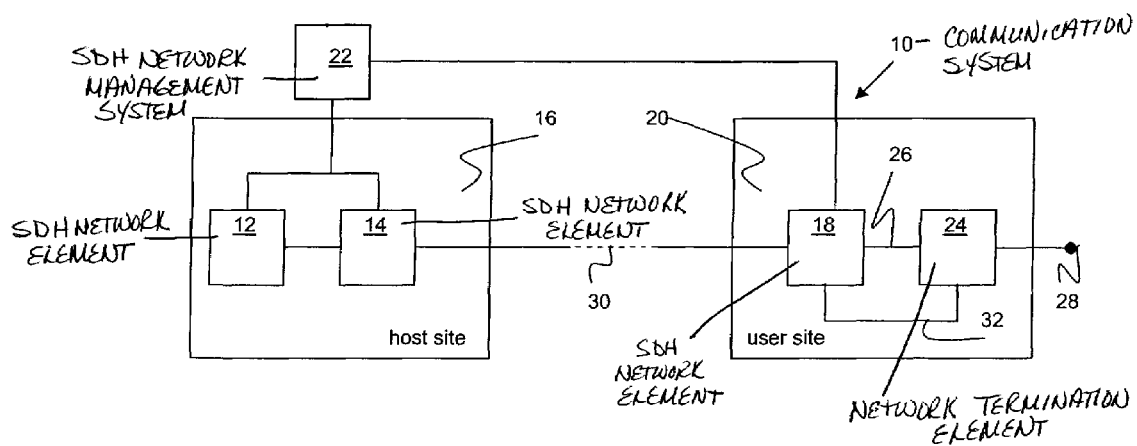
FIG. 1 illustrates a first prior art communication system comprising an SDH network and a managed Ethernet network.

Furthermore, it will be noted that this invention does not require that a SDH network element 18 be present at the user site 20 and that a SDH link 30 be connected between the host 16 and the user 20 sites to transport what is essentially Ethernet information in SDH format, as described with reference to the communication system 10 in FIG. 1. Therefore, again, the present invention is considered an improvement over prior art communication system 10.

Furthermore, the user termination element 84 can be arranged to provide status information to the SDH network element 76 by transmitting the status information within the format of an Ethernet frame transported over the Ethernet link 96. Alternatively, the user termination element 84 can be arranged to provide status information to the SDH network element 76 by transmitting the status information between successive Ethernet frames transported over the Ethernet link 96. Thereby, the user termination element 84 can generate an unprompted alarm that is transmitted to the SDH network element 76.

The SDH network element 76 may also be arranged to issue an instruction to the user termination element 84 by transmitting the instruction within the format of an Ethernet frame transported over the Ethernet link 96. Alternatively, the SDH network element 76 may be arranged to issue an instruction to the user termination element 84 by transmitting the instruction between successive Ethernet frames transported over the Ethernet link 96. Thereby, the SDH network element 76 can change the status of the user termination element 84 by issuing instructions that are transmitted to the user termination element 84.

It will be understood that in relation to the invention, the term "information" can mean communication, message, frame or traffic.

The invention claimed is:

1. A communication system, comprising: a synchronous digital hierarchy (SDH) network, an Ethernet network, the SDH network having an SDH network management system to monitor functionality of network elements in the SDH network, the SDH network being arranged to transport at least Ethernet information in SDH format across the SDH network, the SDH network being at least partially situated at a host site, the Ethernet network being situated at a user site, the SDH network comprising an SDH network element arranged to convert the Ethernet information in the SDH format into Ethernet format information for transportation between the host and user sites via a link between the host and user sites, the Ethernet network comprising an Ethernet network element to receive the Ethernet format information, and a user network termination element connected by a direct connection to the SDH network element, the user network termination element being arranged to convert information from optical Ethernet format to electrical Ethernet format and from the electrical Ethernet format to the optical Ethernet format, the SDH network element being operative to request a status of the Ethernet network element when the SDH network element is required to update the SDH network management system with status information on the functionality of at least one of the SDH network element and the Ethernet network element, the direct connection between the SDH network element and the user network termination element being used for determining if the user network termination element is functioning correctly.

2. The communication system, as claimed in claim 1, wherein the SDH network element comprises network termination equipment.

3. The communication system, as claimed in claim 2, wherein the network termination equipment comprises an SDH multiplexer and an associated Ethernet conversion card.

4. The communication system, as claimed in claim 1, wherein the SDH network element is arranged to request the status of the Ethernet network element by transmitting the request for status within the format of an Ethernet frame transported over the link.

5. The communication system, as claimed in claim 1, wherein the SDH network element is arranged to request the status of the Ethernet network element by transmitting the request for status between successive Ethernet frames transported over the link.

6. The communication system, as claimed in claim 4, wherein the Ethernet network element is arranged to provide a response to the request for status from the SDH network element by transmitting the response within the format of an Ethernet frame transported over the link.

7. The communication system, as claimed in claim 5, wherein the Ethernet network element is arranged to provide a response to the request for status from the SDH network element by transmitting the response between successive Ethernet frames transported over the link.

8. The communication system, as claimed in claim 4, wherein the Ethernet network element is arranged to provide status information to the SDH network element by transmitting the status information within the format of an Ethernet frame transported over the link.

9. The communication system, as claimed in claim 5, wherein the Ethernet network element is arranged to provide status information to the SDH network element by transmitting the status information between successive Ethernet frames transported over the link.

10. The communication system, as claimed in claim 4, wherein the SDH network element is arranged to issue an instruction to the Ethernet network element by transmitting the instruction within the format of an Ethernet frame transported over the link.

11. The communication system, as claimed in claim 5, wherein the SDH network element is arranged to issue an instruction to the Ethernet network element by transmitting the instruction between successive Ethernet frames transported over the link.

12. The communication system, as claimed in claim 1, wherein the link is a point-to-point optical link.

13. The communication system, as claimed in claim 1, wherein the Ethernet network element comprises an opto-electrical converter.

14. The communication system, as claimed in claim 1, wherein the SDH network element is further arranged to convert Ethernet format information received from the Ethernet network into SDH format information for transportation across the SDH network.

15. A method of communication between a synchronous digital hierarchy (SDH) network and an Ethernet network, the method comprising the steps of: monitoring functionality of network elements in the SDH network using an SDH network management system, arranging the SDH network to transport at least Ethernet information in SDH format across the SDH network, situating the SDH network at least partially at a host site, situating the Ethernet network at a user site, arranging an SDH network element of the SDH network to convert the SDH format Ethernet information into Ethernet format information, transporting the Ethernet format information between the host and user sites via a link between the host and user sites, receiving the Ethernet format information with an Ethernet network element at the Ethernet network, and connecting a user network termination element by a direct connection to the SDH network element, the user network termination element converting information from optical Ethernet format to electrical Ethernet format and from the electrical Ethernet format to the optical Ethernet format, the SDH network element being operative to request a status of the Ethernet network element when the SDH network element is required to update the SDH network management system with status information on the functionality of at least one of the SDH network element and the Ethernet network element, and using the direct connection between the SDH network element and the user network termination element for determining if the user network termination element is functioning correctly.

16. A communication system, comprising: a first network, a second network, the first network having a network management system to monitor functionality of network elements in the first network, the first network being arranged to transport at least some information intended for the second network across the first network in a format compatible with the first network, the first network being at least partially situated at a host site, the second network being situated at a user site, the first network comprising a network element arranged to convert the format of the information intended for the second network into second network format information compatible with the second network for transportation between the host and user sites via a link between the host and user sites, the second network comprising a network element to receive the second network format information, and a user network termination element connected by a direct connection to the network element of the first network, the user network termination element being arranged to convert information from an optical to an electrical format of the second network and from the electrical to the optical format of the second network, the network element of the first network being operative to request the status of the network element of the second network when the network element of the first network is required to update the network management system of first network with status information on the functionality of at least one of the network element of the first network and the network element of the second network, the direct connection between the network element of the first network and the user network termination element being used for determining if the user network termination element is functioning correctly.

17. A method of communicating between a first network and a second network, the method comprising the steps of: monitoring functionality of network elements in the first network using a network management system, arranging the first network to transport at least some information intended for the second network across the first network in a format compatible with the first network, situating the first network at least partially at a host site, situating the second network at a user site, arranging a network element of the first network to convert the format of the information intended for the second network into second network format information compatible with the second network, transporting the second network format information between the host and user sites via a link between the host and user sites, receiving the second network format information at the second network with a network element of the second network, and connecting a user network termination element by a direct connection to the network element of the first network, the user network termination element converting information from an optical to an electrical format of the second network and from the electrical to the optical format of the second network, the network element of the first network being operative to request a status of the network element of the second network when the network element of the first network is required to update the network management system of the first network with status information on the functionality of at least one of the network element of the first network and the network element of the second network, and using the direct connection between the network element of the first network and the user network termination element for determining if the user network termination element is functioning correctly.

* * * * *